United States Patent
Kane et al.

(10) Patent No.: US 11,565,888 B1
(45) Date of Patent: Jan. 31, 2023

(54) MODULAR HEAD CLEANING DEVICE AND SYSTEM

(71) Applicant: Crossford International, LLC, Stamford, CT (US)

(72) Inventors: Timothy J. Kane, Stamford, CT (US); Gregory Wyatt, Stamford, CT (US); Evan Reyes, Stamford, CT (US); Joseph Franzino, Stamford, CT (US); Russell Barnes, Stamford, CT (US); Robert Folchi, Stamford, CT (US)

(73) Assignee: Crossford International, LLC, Stamford, CT (US)

( * ) Notice: Subject to any disclaimer, the term of this patent is extended or adjusted under 35 U.S.C. 154(b) by 0 days.

(21) Appl. No.: 17/658,835

(22) Filed: Apr. 12, 2022

(51) Int. Cl.
   *B65G 45/22* (2006.01)
(52) U.S. Cl.
   CPC .................................. *B65G 45/22* (2013.01)
(58) Field of Classification Search
   CPC ......... B65G 45/22; B65G 45/14; B65G 45/24
   See application file for complete search history.

(56) References Cited

U.S. PATENT DOCUMENTS

| | | | | |
|---|---|---|---|---|
| 5,333,724 A | * | 8/1994 | Wingfield | B65G 45/22 15/302 |
| 5,711,050 A | * | 1/1998 | Pimentel | B65G 45/08 184/15.3 |
| 6,244,423 B1 | * | 6/2001 | Tacchi | B08B 3/022 198/493 |
| 6,364,959 B1 | * | 4/2002 | Straub | B65G 45/22 162/278 |
| 6,971,503 B2 | | 12/2005 | Thompson | |

(Continued)

FOREIGN PATENT DOCUMENTS

| CN | 104646329 A | 5/2015 |
|---|---|---|
| CN | 105195459 A | 12/2015 |

(Continued)

OTHER PUBLICATIONS

Hepco Motion, Steam Cleaning of Conveyors—HepcoMotion https://www.hepcomotion.com/case-studies/steam-cleaning-of-conveyors/, last accessed Mar. 19, 2022.

(Continued)

*Primary Examiner* — Mark A Deuble
(74) *Attorney, Agent, or Firm* — Tatonetti IP

(57) ABSTRACT

A cleaning apparatus for an endless conveyor belt is provided. The cleaning apparatus is operable for a rotary cleaning head to perform a cleaning action on a first section of the endless conveyor belt. In an embodiment of the present invention, the rotary cleaning head comprises a rotating disc assembly. The rotary cleaning assembly is operable for a mobile mount to position the rotary cleaning head into a first cleaning contact position with the endless conveyor belt. To affix the rotary cleaning head assembly to a mount, a connecting portion having a proximal end and a distal end, wherein the proximal end includes a first coupling is provided. Said coupling is capable of making a connection to and disconnecting from the mobile mount, and said distal end capable of making a connection and disconnecting from the rotary cleaning head and adapted for use with the rotary cleaning head.

26 Claims, 13 Drawing Sheets

(56) References Cited

U.S. PATENT DOCUMENTS

| | | | | |
|---|---|---|---|---|
| 7,077,260 | B2 * | 7/2006 | Saballus | B65G 45/22 |
| | | | | 134/122 R |
| 7,293,572 | B2 * | 11/2007 | Honkala | B08B 5/04 |
| | | | | 118/317 |
| 7,784,476 | B2 * | 8/2010 | Handy | B08B 1/008 |
| | | | | 134/172 |
| 9,248,975 | B2 * | 2/2016 | Handy | B65G 45/26 |
| 10,150,623 | B2 * | 12/2018 | Handy | B05B 13/0478 |
| 10,954,077 | B1 * | 3/2021 | Yoo | B65G 45/22 |
| 2019/0084773 | A1 * | 3/2019 | Handy | B65G 45/22 |

FOREIGN PATENT DOCUMENTS

| | | |
|---|---|---|
| CN | 105521900 A | 4/2016 |
| CN | 208837043 U | 5/2019 |
| CN | 107081312 A | 7/2019 |
| CN | 211969928 U | 11/2020 |
| CN | 212808101 U | 3/2021 |
| CN | 213161464 U | 5/2021 |
| JP | 5455409 A | 3/2014 |

OTHER PUBLICATIONS

IBL Specfik, IBL Specifik | Robotic Steam Cleaning of Conveyor Belts https://www.iblspecifik.com/en/our-products/steamatik-nettoyage-automatise-des-tapis-convoyeurs-a-mailles/, last accessed Mar. 19, 2022.

Goodway Product Overview, Jet System Dry Steam Belt Cleaner https://www.goodway.com/products/belt-cleaning-system/industrial-dry-vapor-belt-cleaning-systems, last accessed Mar. 19, 2022.

\* cited by examiner

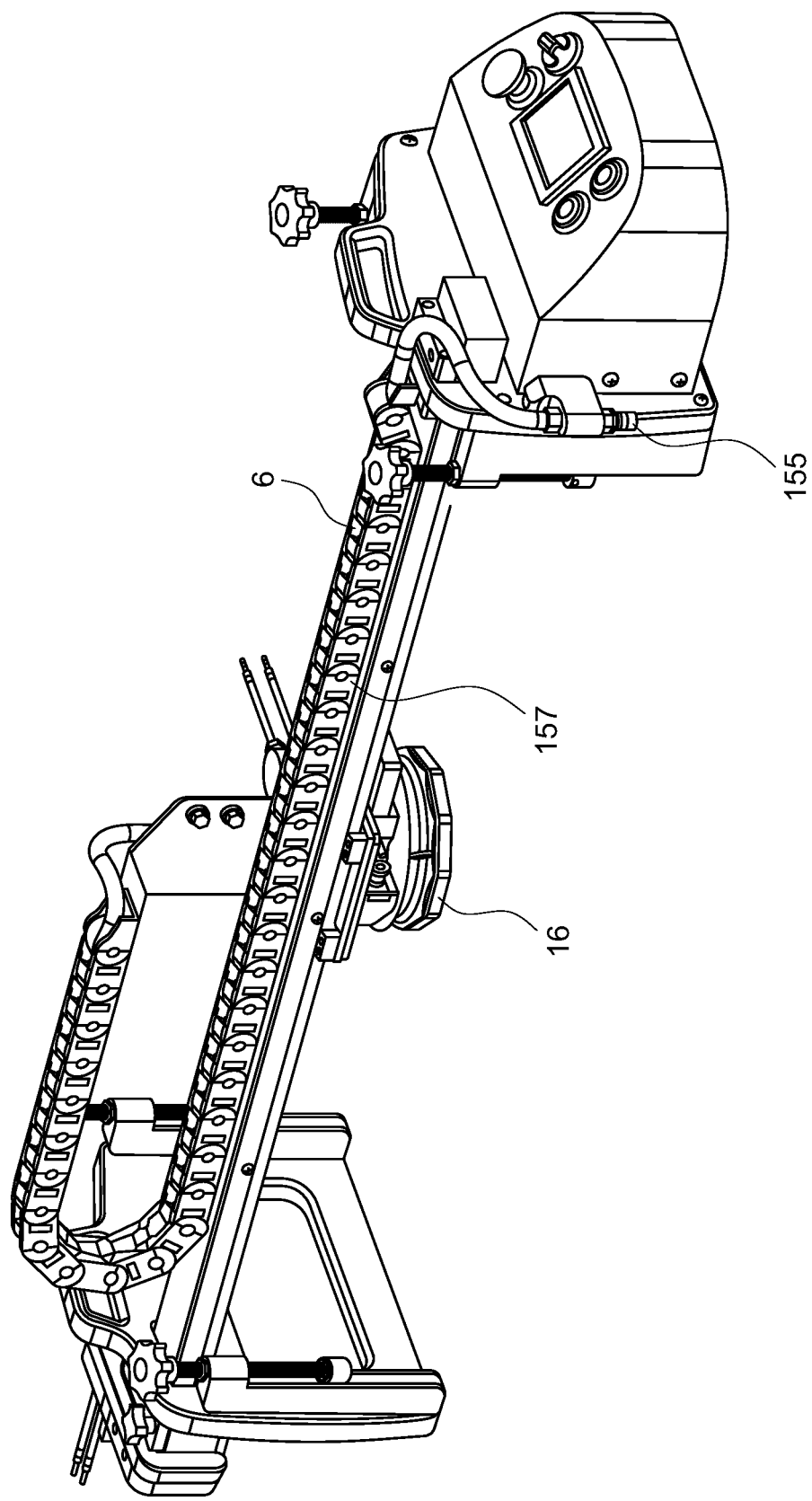

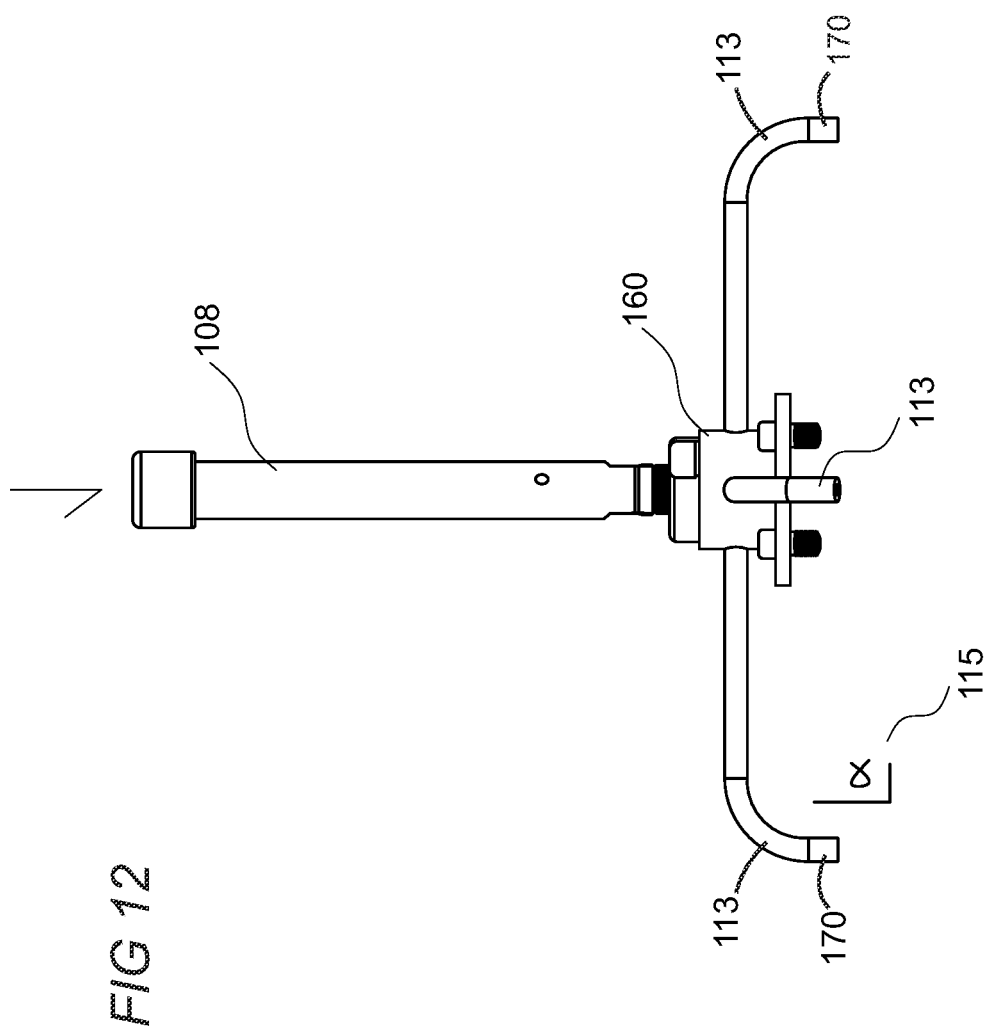

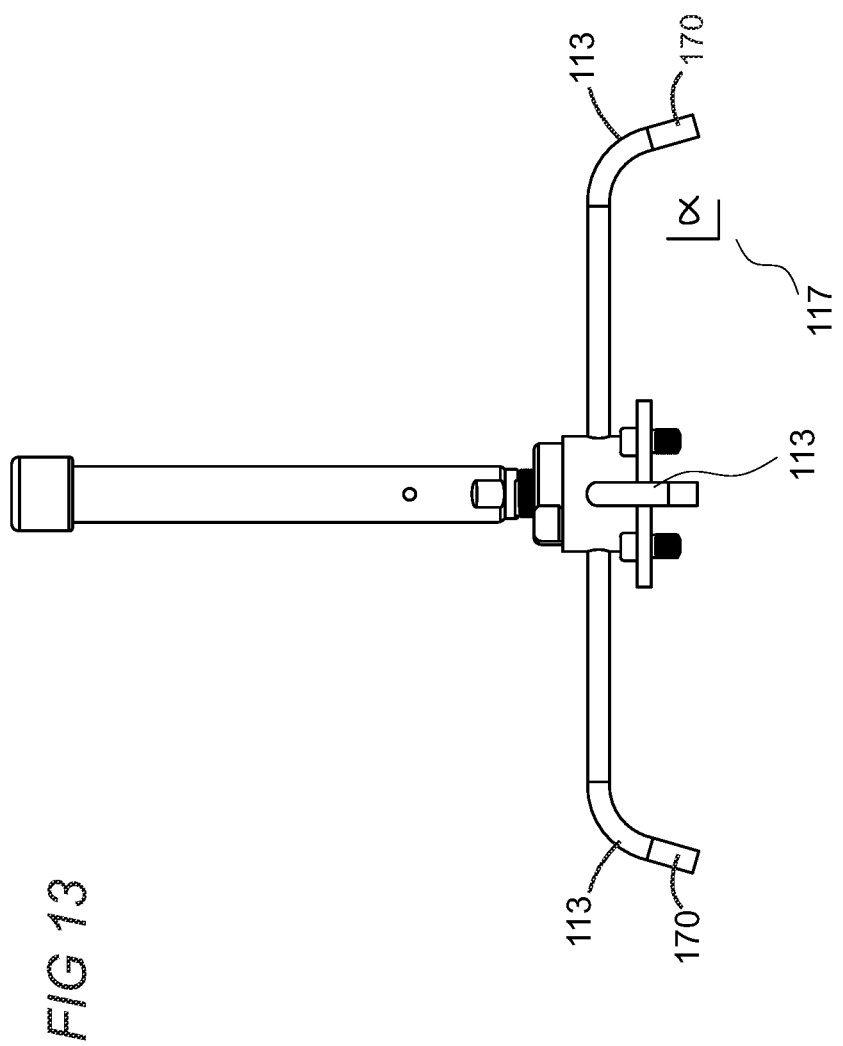

MODULAR HEAD CLEANING DEVICE AND SYSTEM

TECHNICAL FIELD

The present invention relates to systems and methods for surface cleaning, such as cleaning commercial conveyor belts as may be used, for example, in the continuous food preparation and baking arts; and more particularly to a conveyor belt cleaner system for detecting food allergens or chemicals and then employing a modular head cleaning mechanism to remove said known food allergens or chemicals that are often entrapped or ensnared on or in the conveyor belt during food preparation processing.

BACKGROUND OF THE INVENTION

The present invention is directed to the art of cleaning surfaces, such as commercial conveyor belts that are used in connection with the manufacture of various types of goods that may incorporate ingredients or components that under different circumstances could be considered contaminants, and sometimes dangerous, if cross contamination were to occur during the manufacturing or processing of other types of goods on the same conveyor belt subsequently.

Conveyors are widely used for conveying a variety of products, including discrete items or assemblies as well as bulk materials. In many instances some of the materials coming in contact with the conveyor will cling or adhere thereto. These materials may include product fines or trimmings, excess product, excess finishing materials, or extraneous materials from other sources such as accumulations of lubricants or dirt, may include adherent liquids such as paints, and may include debris from pharmaceutical products. All such materials are encompassed by the term "debris" hereinafter. The retention or accumulation of such debris on the conveyor usually is undesirable or unacceptable. Accordingly, removal is desirable or necessary as a condition of continued operations or to enhance efficiency of continued operations and may require periodic shut-down of the operation of the system for cleaning purposes. Further, a cleaning head capable of being directed to said debris would improve both the efficiency and effectiveness of a modular head resulting in less down time and increased product safety.

In the prior art, conveyor belts used in various commercial activities are known to become soiled, typically with spillage from materials being conveyed or treated on the belt. It becomes desirable and necessary to clean at least the working upper surface of the belt. The need for such cleaning is heightened when for example food products, pharmaceuticals, and other indigestible items are the article of manufacture. The need is more crucial when the ultimate article of manufacture under preparation on the conveyor belt contains ingredients or components that if accidentally permitted to contaminate certain different articles of manufacture could result in harm and potentially death. The need is felt even more acutely when contaminates may not be visible to the naked eye.

As manufacturing demands have increased, often the diversity of products manufactured on any given conveyor belt has similarly grown, and with it the laws governing and controlling product manufacturing and labelling, as well as regulating the processing and inclusion or exclusion of specific ingredients or components, by intent or accident, particularly with regard to pharmaceutical products. Thus, there is an urgent need for improved means for effectively removing allergens, pharmaceutical residue and contaminants from the conveyor belts, particularly when these allergens, residue and contaminants are difficult to observe.

Historically, cleaning conveyor belts has been a burdensome task accomplished by installing a cleaning device in the path of the belt and allowing the belt to pass through the cleaning device, perhaps several times, until the extraneous material is removed. However, as discussed above, recent laws, requirements, and consumer expectations have increased the burden on manufacturers of food products, pharmaceuticals, and other ingestible goods, particularly those that produce multiple types of products, some of which may contain various types of allergens or the like that could cause adverse reactions if ingested or used accidentally by uninformed consumers. This problem is even more acute if said consumers are prone to such allergies or sensitivities. Thus, a need is felt in the art to make ensure that various products are both properly labeled to identify the inclusion or exclusion of such particulates and to prevent the accidental contamination of their other products manufactured using the same conveyor belt.

Adding complexity to this already existing problem, modern manufacturing techniques often use finely granulated products that produce residue invisible to the naked eye. Such residue may contain contaminants detrimental or harmful if ingested as would be the case with regard to pharmaceutical residue.

The problem of adherence and accumulation of debris typically is enhanced when the product being handled or the environment of use exposes the conveyor to oils, food toppings, lubricants, paints or other adherent materials. Also, the cleaning requirements and problems referred to above are enhanced when dealing with food and pharmaceutical products because of the need to avoid contamination of the end products as well as to minimize or avoid the inclusion of product debris or fragments in the packages of the end product. Governmental regulations and desirable operating practices also typically require periodic complete washing and/or steam cleaning of equipment which contacts food or pharmaceutical products during production, with dismantling of relevant processing mechanisms for such cleaning.

U.S. Pat. No. 7,784,476 to Handy (the "'476 Patent") discloses and claims a portable cleaning system for cleaning a moving item such as an escalator or conveyor belt. The system comprises an overhead steam jet assembly slidably mounted on transverse rails for motion transverse to the direction of motion of the escalator or conveyor belt. The transverse rails are disposed between width-adjustable end pieces that rest on stationary outer members of the escalator. A shortcoming of this system is that the steam jet assembly has no mechanism to direct the assembly to particular locations on the belt. Perhaps, the most significant drawback presented by the system is its failure to address the removal of certain particulates (e.g., whole, crushed, or fragmented seeds and nuts, soybean particulate, wheat debris, egg debris, and fish or shellfish remains), which may become embedded in the surface conveyor belts. Indeed, it is likely that the mechanism of the assembly claimed in the '476 Patent would likely exacerbate these precise concerns.

U.S. Pat. No. 9,248,975 to Handy (the "'975 Patent") also discloses and claims a portable cleaning system for cleaning a moving item such as an escalator or conveyor belt. The system comprises an overhead steam jet assembly slidably mounted on transverse rails for motion transverse to the direction of motion of the escalator or conveyor belt. The transverse rails are disposed between width-adjustable end pieces that rest on stationary outer members of the escalator.

As set forth in the '476 Patent, a shortcoming of this system is that the steam jet assembly is that no mechanism exists to direct the assembly to particular locations on the belt. Perhaps, the most significant drawback presented by the system is its failure to address the removal of certain particulates (e.g., whole, crushed, or fragmented seeds and nuts, soybean particulate, wheat debris, egg debris, and fish or shellfish remains), which may become embedded in the surface conveyor belts. Indeed, it is likely that the mechanism of the assembly claimed by the '975 Patent would likely exacerbate these precise concerns.

U.S. Pat. No. 10,150,623 to Handy (the "'623 Patent") discloses and claims a cleaning apparatus comprising a connection part permitting connection to a supply of cleaning fluid, and a rotatable member rotatably movable relative to the connection part, the rotatable member being in a form of a disc with an opening within the disc in connection with the connection part to receive cleaning fluid therefrom, with one or more outlets extending from the opening in the disc, to an exterior of the disc, to supply cleaning fluid to an area or item to be cleaned, wherein the rotatable member is made of a plastics material, and wherein the rotatable member is driven by a gear provided on the rotatable member and the gear is drivable by a motor. A shortcoming of this system is that the steam jet assembly is that no mechanism exists to direct the assembly to particular locations on the belt. Perhaps, the most significant drawback presented by the system is its failure to address the removal of certain particulates (e.g., whole, crushed, or fragmented seeds and nuts, soybean particulate, wheat debris, egg debris, and fish or shellfish remains), which may become embedded in the surface conveyor belts. Indeed, it is likely that the mechanism of the assembly claimed by the '623 Patent would likely exacerbate these precise concerns.

U.S. Pat. No. 6,971,503 to Thompson (the "'503 Patent") discloses A conveyor belt cleaning apparatus for cleaning a continuous loop conveyor belt having a surface and within a check stand, comprising: a debris-removal stage; a washing stage; a rinsing stage; a drying stage; and a multi-chambered drawer and each of said stages is provided with an isolated bin within the drawer; wherein said surface of said continuous loop conveyor belt passes through said stages to remove any debris and bacteria. A shortcoming of this system is that the steam jet assembly is that no mechanism exists to direct the assembly to particular locations on the belt. Perhaps, the most significant drawback presented by the system is its failure to address the removal of certain particulates (e.g., whole, crushed, or fragmented seeds and nuts, soybean particulate, wheat debris, egg debris, and fish or shellfish remains), which may become embedded in the surface conveyor belts. Indeed, it is likely that the mechanism of the assembly claimed by the '503 Patent would likely exacerbate these precise concerns.

While, as explained earlier, numerous commercial systems exist in the prior art for cleaning escalators and conveyor belts, (e.g., the KHD HepcoMotion steam cleaner; KHD Brushless Belt Cleaning System; the Therma-Kleen Conveyor Belt Cleaner; the Amerivac-Houdini Belt Cleaning System; the Electrosteam-Belt Cleaning System; the Dupray Belt Cleaning System; and the Mekini Belt Cleaning System, which are the subjects of the '476, '975, '623, '626, and '331 Patents respectively), each of them are unable to address the specific needs presented herein for several reasons. For example, a shortcoming of this system is that the steam jet assembly is that no mechanism exists to direct the assembly to particular locations on the belt. Indeed, it is likely that the mechanism of these known assemblies would likely exacerbate these precise concerns.

What is needed in the art is a conveyor belt cleaning system for cleaning the working surface of continuous belts formed of a flexible material such as plastic or fabric, used for example, in the continuous preparation of food products, pharmaceuticals, and other ingestible products. The desired conveyor belt cleaning system will provide a means for such manufacturers of food products, pharmaceuticals, and other ingestible goods, and most notably those that produce multiple types of products, where some of such products may contain various types of allergens or the like that could cause adverse reactions if ingested or used by unsuspected consumers prone to such allergies or sensitivities to prevent the accidental contamination of their other products manufactured using the same conveyor belt through the effective removal of such contaminants and allergens. Further, what is needed in the art is such a conveyor belt cleaning system wherein the cleaning head can be directed to area of the belt having excess debris. Still further, what is needed in the art is a cleaning head that can be directed to miniscule and difficult to ascertain particulate matter located on the belt.

SUMMARY OF THE INVENTION

A cleaning apparatus is configured with a cleaning head for cleaning an endless conveyor belt. The cleaning apparatus operates with a rotary cleaning head to perform a cleaning action on a first section of the endless conveyor belt. In an embodiment of the present invention, the rotary cleaning head comprises a rotating disc assembly. The rotary cleaning assembly is operable for a mobile mount to position the rotary cleaning head into a first cleaning contact position with the endless conveyor belt. To affix the rotary cleaning head assembly to a mount, a connecting portion having a proximal end and a distal end, wherein the proximal end includes a first coupling is provided. Said coupling is capable of making a connection to and disconnecting from the mobile mount, and said distal end capable of making a connection and disconnecting from the rotary cleaning head and adapted for use with the rotary cleaning head.

Further, a cleaning system that employs a cleaning head for an endless conveyor belt is provided. The cleaning system is operable for a rotary cleaning head to performing a cleaning action on a first section of the endless conveyor belt. The rotary cleaning system is operable for a mobile mount to position the rotary cleaning head into a first cleaning contact position with the endless conveyor belt. To affix the rotary cleaning head assembly to a mount, a connecting portion having a proximal end and a distal end wherein the proximal end includes a first coupling is provided. Said coupling is capable of making a connection to and disconnecting from the mobile mount, and said distal end capable of making a connection and disconnecting from the rotary cleaning head and adapted for use with the rotary cleaning head.

In a preferred embodiment of the invention, the rotary cleaning head further comprises a removable spindle. In an embodiment of the invention, a pump is attached to the rotary cleaning head and is operable to cause a liquid or vapor under pressure to enter the rotary cleaning head.

A method for cleaning an endless conveyor using a cleaning head is also provided. A rotary cleaning head capable of performing a cleaning action on a first section of the endless conveyor belt is attached to a distal end of a connecting portion. A connecting portion is attached to a first coupling of the mobile mount. The rotary cleaning head is moved into a first cleaning contact position with the endless conveyor belt by use of the mobile mount; and a cleaning action is performed on a first section of the endless conveyor belt. Although a single cleaning head is shown, in some implementations, there may be multiple cleaning heads utilized for a single conveyor belt to improve cleaning of the conveyor belts and reduce wear and tear on a given cleaning head unit.

In another exemplary embodiment, disclosed is a modular cleaning head, comprising: a rotary disc configured to clean surfaces while engaging in a rotational movement; a deflector plate positioned above the rotary disc on a side opposite a surface that that rotary disc cleans; and fan blades attached to the rotary disc, in which the fans are positioned above the rotary disc and are adjacent to a bottom surface of the deflector plate.

As another example, wherein the fan blades extend from a central region of the rotary disc to a radial end of the rotary disc. As another example, the fan blades are at least partially curved. In another example, during rotational movement of the rotary disc, a laterally extending air shield is developed which prevents or reduces debris from engaging with the rotary cleaning head during cleaning operations. In another example, the rotary disc is polygonal-shaped. As another example, the rotary disc is decagon shaped. In another example, further comprising a connecting bar that connects to an external structure. As another example, the connecting bar is substantially horizontal. As another example, further comprising a motor that is part of the rotary cleaning head's frame. In another example, the motor imparts drive from a drive chain to an adjacently-positioned cog and pulley arrangement which translates the drive to the rotary disc.

BRIEF DESCRIPTION OF THE DRAWINGS

FIG. 11 shows a schematic view of the modular head cleaning device with a flexible fluid hose and wire carriage.

FIG. 12 shows a schematic first side plumbing view of the modular cleaning head.

FIG. 13 shows a schematic second side plumbing view rotated 90 degrees around a vertical axis from the first side plumbing view of the rotary head.

DETAILED DESCRIPTION OF THE INVENTION

Throughout the following description, specific elements are set forth to provide a more thorough understanding of the invention. However, in some embodiments the invention may be practiced without some of these elements. In other instances, well known elements have not been shown or described in detail to avoid unnecessarily obscuring the disclosure. Accordingly, the specification and drawings are to be regarded as illustrative rather than restrictive. It is to be further noted that the drawings may not be to scale for all applications of the system and components disclosed and claimed hereby.

Figure 1:
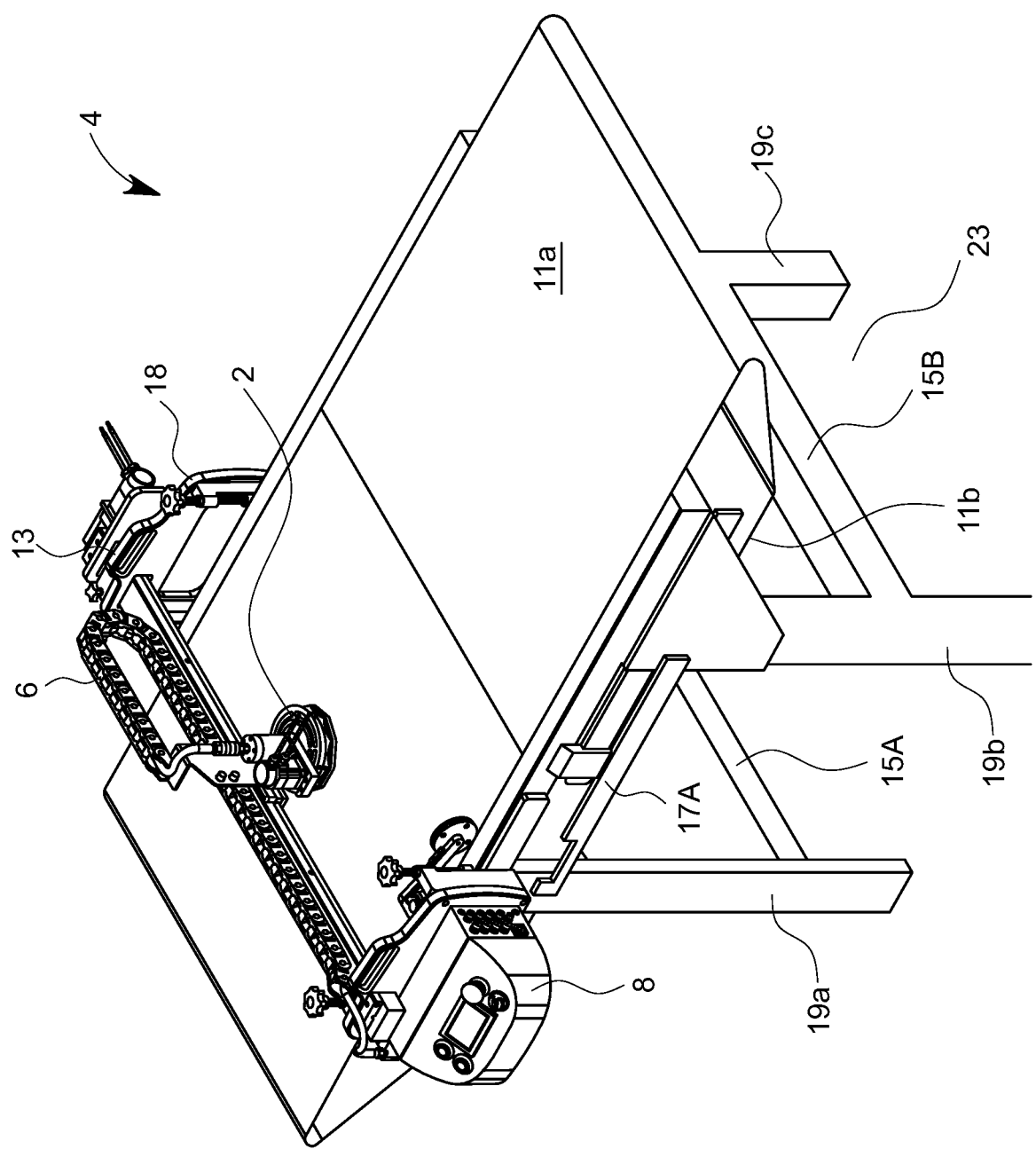
FIG. 1 shows an isometric view of the modular cleaning head device and the endless conveyor belt.
Figure 2:
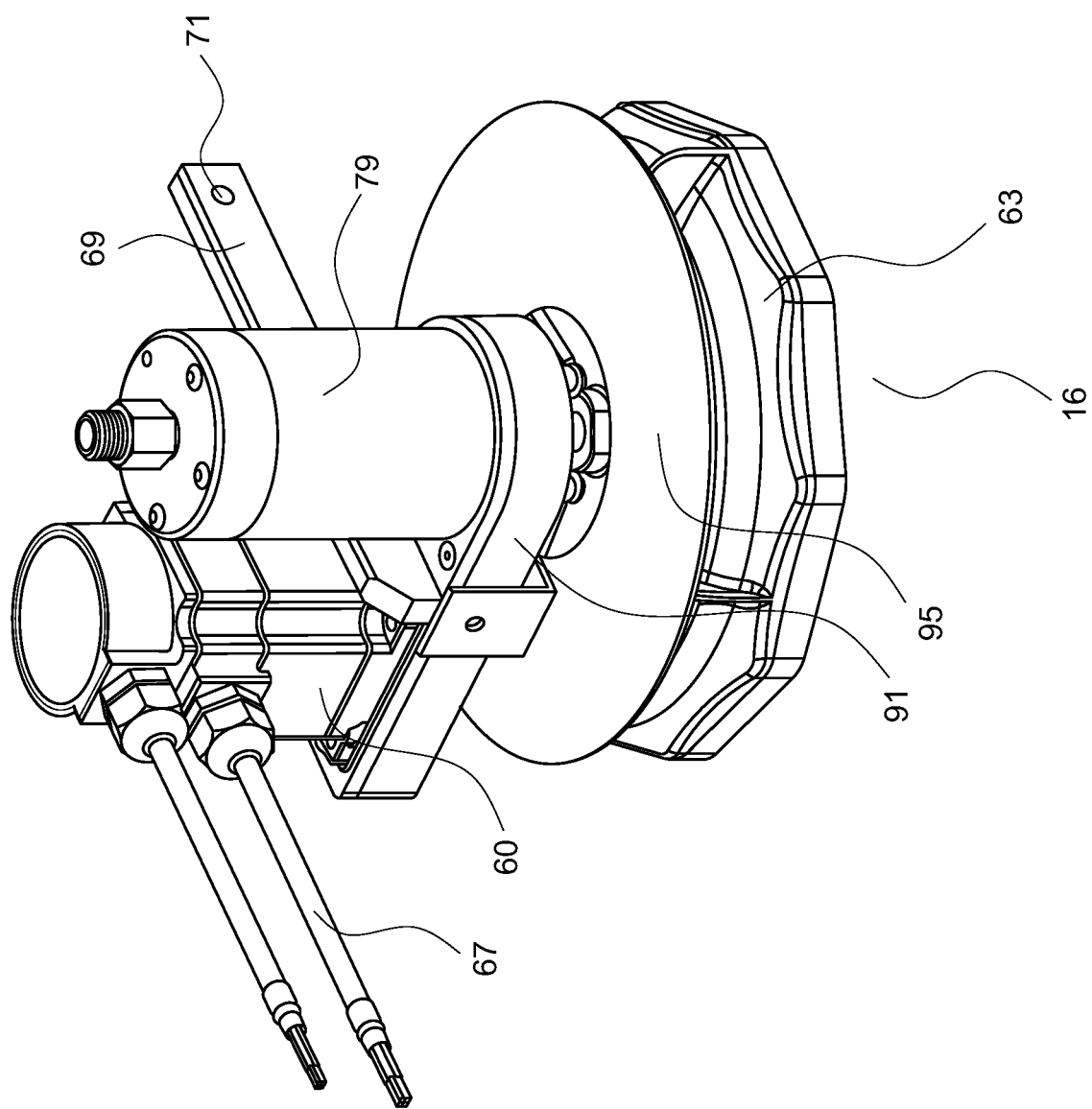
FIG. 2 shows an isometric view of a modular cleaning head.

With respect FIGS. 1 and 2, a modular cleaning head 2 is shown with respect to the cleaning system 4. The modular cleaning head 2 is disposed above a conveyor belt 11 of the cleaning system and is operable to provide a cleaning action to the conveyor belt 11 having an upper conveyor belt 11a and lower conveyor belt 11b. Although a single cleaning head is shown, in some implementations, there may be multiple cleaning heads utilized for a single conveyor belt to improve cleaning of the conveyor belts and reduce wear an tear on a given cleaning head unit. Any additional cleaning heads may be configured similarly to the original cleaning head and utilize their own set of components that are attached to the frame, such as a separate connection points or other components necessary to operate the additional unit.

The modular cleaning head 2 is operable to receive a variety of cleaning heads and is capable of dispensing chemicals, air, water or steam by a plurality of nozzles. The modular cleaning head is configured to provide a cleaning action to the belt 11 either by directly contacting the belt or by causing a medium, such as steam, to contact the belt. Said contact thereby generating a cleaning action removing particulates and debris. Further, the modular cleaning head 2 is easily replaceable and can have a variety of configurations. In a preferred embodiment of the invention, a rotary cleaning head 16 can be used as the modular cleaning head 2. In another embodiment of the present invention, the modular cleaning head 2 could comprise a rotary or oscillating brush arrangement, the brushes removing particulate matter from the belt 11 by a cleaning action by contacting the belt 11.

Both the modular cleaning head 2 and conveyor belt 11 are supported by a base assembly 23 including a plurality of transverse 15(a-b), longitudinal 17 and vertical 19(a-c) struts forming a rectangular assembly supporting a conveyor belt 11 and a frame 13 on which the modular cleaning head 2 is mounted.

A frame 13, for example, constructed of metal or a plastic such as plastic polycarbonate, houses a control panel 8 and provides support for the modular cleaning head 2. An adjustable end frame 18 affixes the frame 13 to the conveyor belt 11. A wire carriage 6 affixed to the modular cleaning head 2 is operative to cause the modular cleaning head 2 to move transversely to the belt 11. In this regard, the wire carriage may be considered a mobile mount to which the modular cleaning head is attached and causes movement thereof. In an embodiment of the present invention, the wire carriage 6 is operable to move transverse to the direction of the belt 11, for example, by means of a gear, pulley or motor assembly utilizing a flange mated to a groove, said movement thereby causing the modular cleaning head 2 to correspondingly move transversely. The mobile mount, or wire carriage 6, can cause the modular cleaning head to move in various positions transversely across the conveyor belt, longitudinally with the conveyor belt, or rotationally, during operation.

FIG. 2 shows a rotary cleaning head 16 of the modular cleaning head 2. A rotary disc assembly 63 is driven by mechanical means by a motor 60. A plurality of motor control wires 67, by an electronic connection with the rotary disc assembly 63, powers and adjusts the speed of the rotary disc assembly 63.

The rotary cleaning head 16 attaches to the wire carriage 6 by a connecting bar 69 which functions as a connecting portion that is affixed to the wire carriage 6 at a fastening point 71. A screw, bolt, or other fastening mechanism may attach the connecting bar's fastening point 71 to the wire carriage 6. For example, a connection element or plate may be attached to the wire carriage 6 and, upon the connecting bar 69 being attached to the connection element or plate, translates to movement of the rotary cleaning head 16. A rotary union 79 also affixes the cleaning head 16 to wire carriage 6. A drive train cover 91 and air guide finger guard 95, or deflector plate, prevent both particulate matter from entering the cleaning head 16 and accidental injury by an operator.

Figure 3:
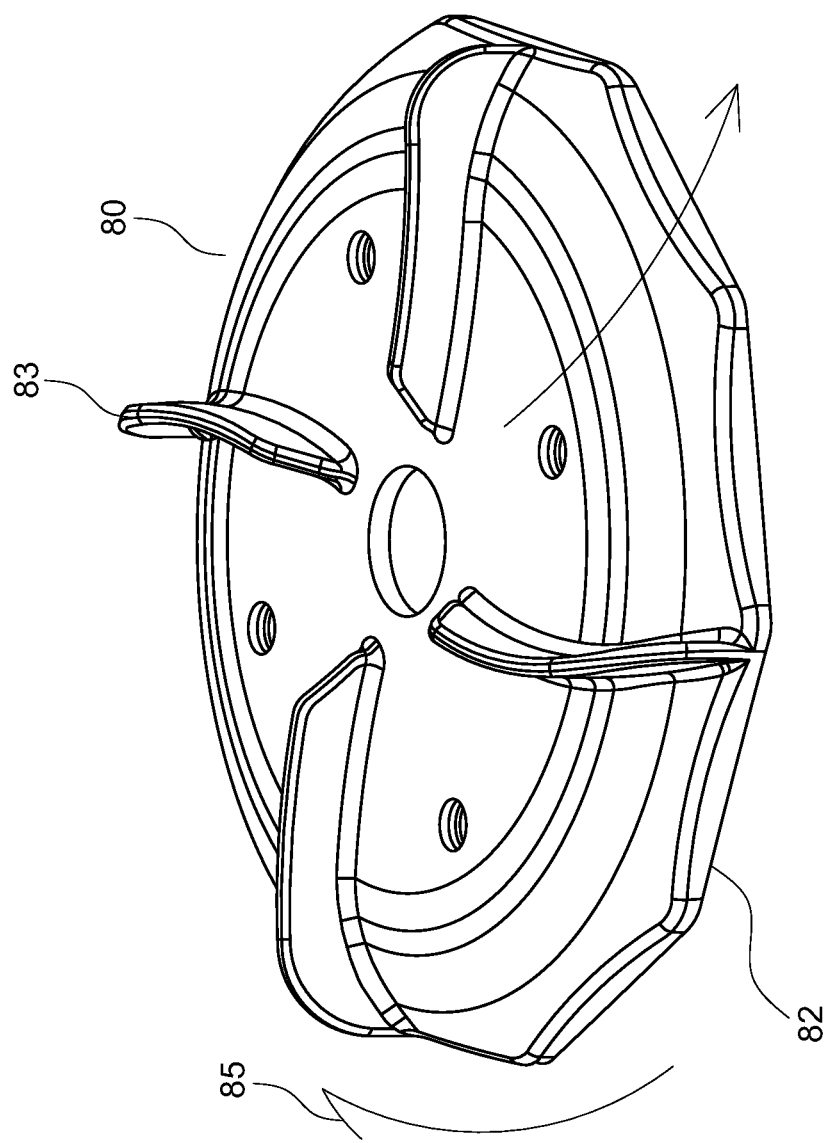
FIG. 3 slows an isometric view or a rotary disc.
Figure 4:
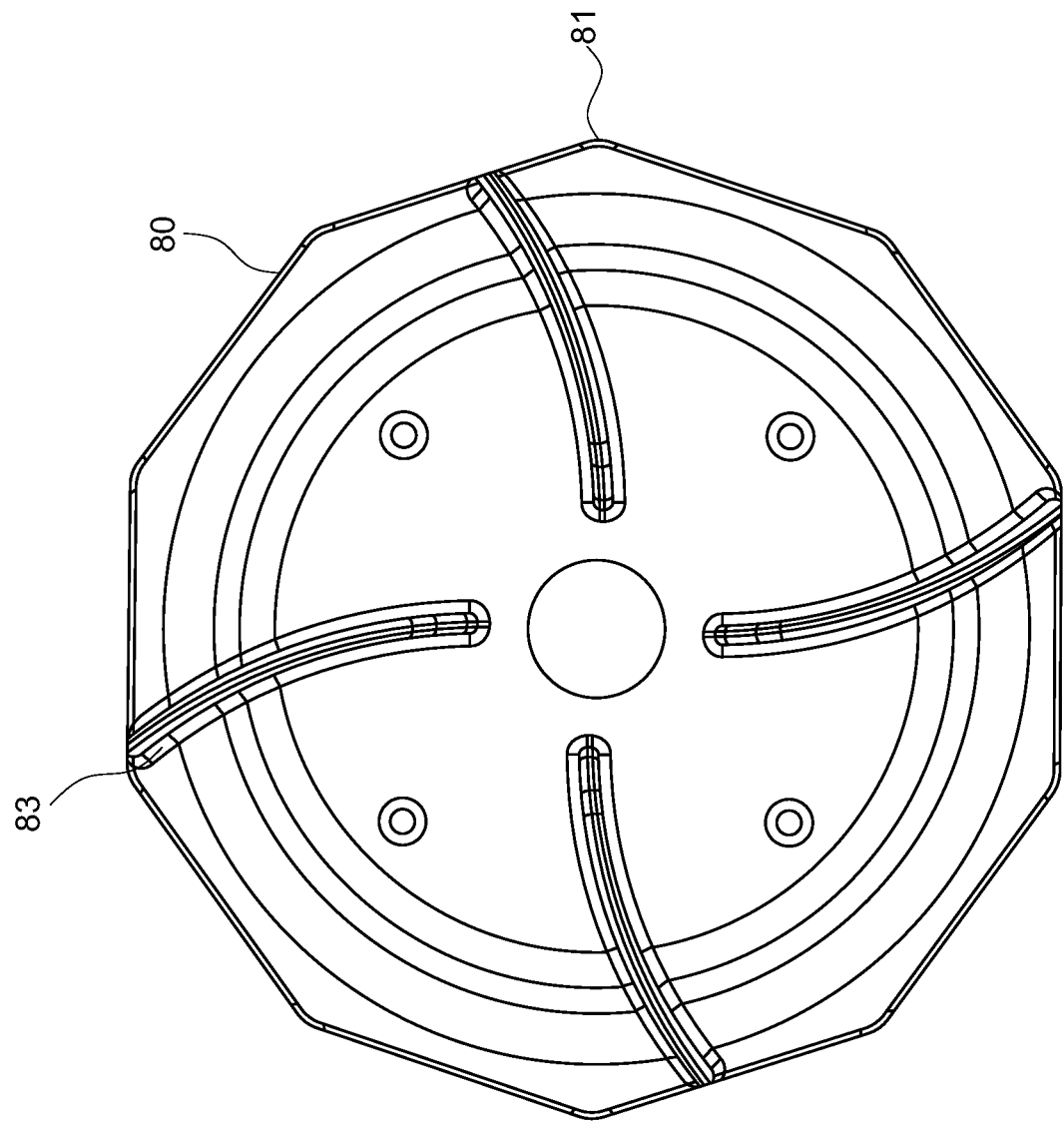
FIG. 4 shows a top view of the rotary disc.

The finger guard 95, which also functions as a deflector plate as discussed below, is positioned above the spinning rotary cleaning head 16 to mitigate potential safety hazards associated with the spinning fins 83 (FIGS. 3 and 4). Configurations in which the space between the solid finger guard 95 (not including the center air inlet) and the spinning rotary cleaning head 16 is minimized can increase the amount of lateral airflow that is generated by the spinning fan blades 83. This lateral airflow can provide an air shield to minimize debris from the cleaned surface traveling upward and settling on the cleaning head. In this regard, the finger guard 95 may have an effect on airflow at certain rotational speeds, thereby functioning as a deflector plate as well.

The rotary disc assembly 63 comprises a rotary disc 80, as shown in FIGS. 3 and 4. The rotary disc 80 rotates in a clockwise rotation 85 around an axis. The rotary disc 80 is decagon-shaped—as opposed to being completely rounded—to enable deflection or mitigating direct impact with inbound obstacles. This minimizes damage to the cleaning head and downtime associated with clearing jammed conveyors. Although a decagon shape is depicted, other polygonal shapes are also possible, such as triangular, rectangular, hexagonal, etc.

A plurality of fan blades 83, or fins, cause a centrifugally generated air curtain between the top of the rotary disc and the surface being cleaned, thereby keeping steam close to the belt 11, partially containing the force and heat of the steam on the belt 11, thereby generating a cleaning action on the belt 11. The fan blades 83 on the rotating surface are used to minimize debris accumulation on nearby surfaces, which may be due to lateral airflow. The use of the fan blades may be of particular benefit to industries where it is desirable to mitigate surface contamination. A plurality of impact points 82 disposed along the circumference of the rotary disc 80 impact and remove potential obstructions on the belt 11.

Figure 5:
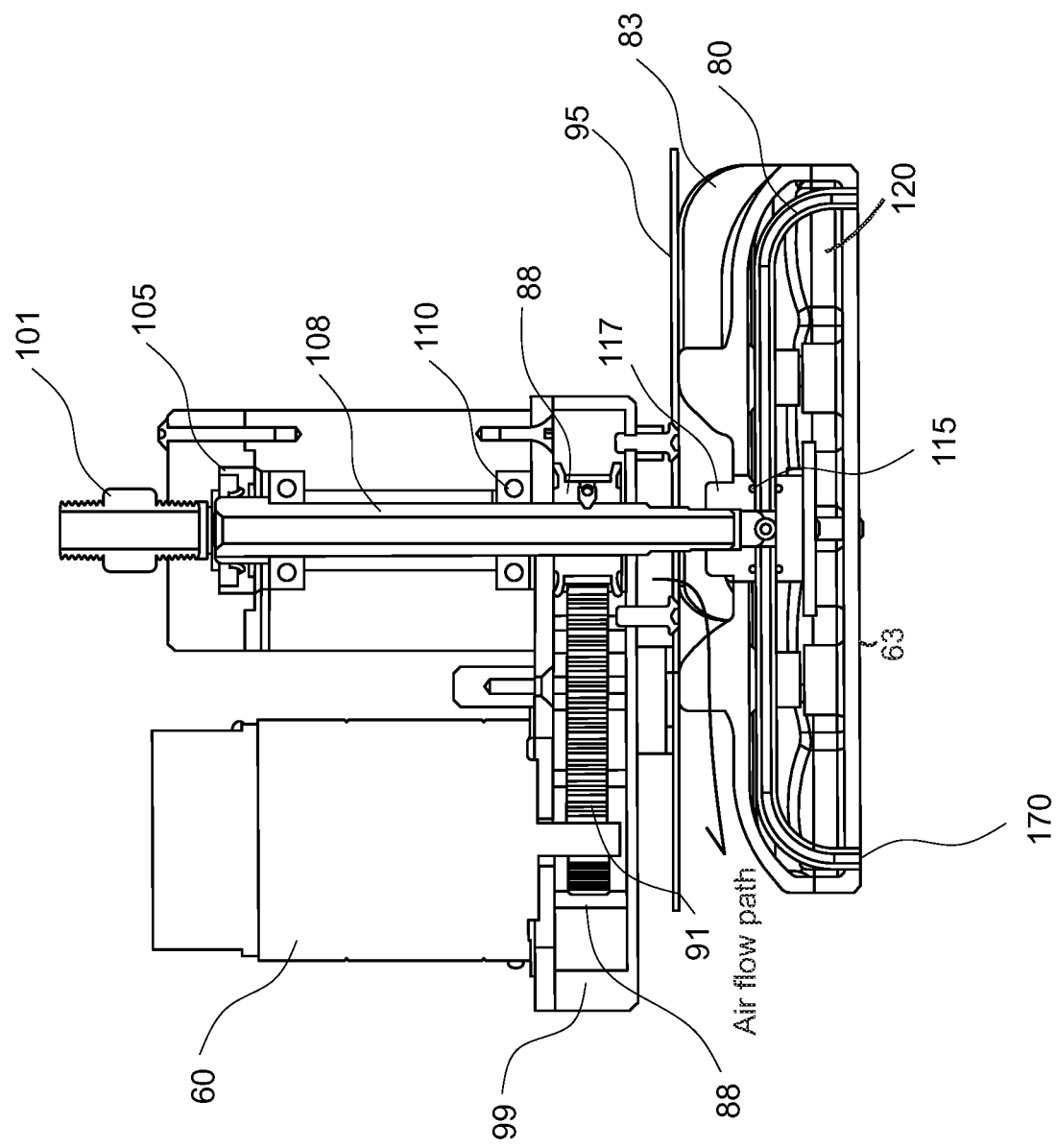
FIG. 5 is an illustrative cut away side view of the rotary cleaning head.

As shown in FIGS. 5, 12 and 13, a motor 60 imparts drive to the rotary disc 80 by using a plurality of cogs 88 and a drive belt or chain 91. In an embodiment of the invention, a drive housing 99 houses the cogs 88 and a first and second pulley arrangement. The cogs 88 and pulley arrangement thereby impart drive from the chain 91 to the rotary cleaning head 16. A steam connector 101 by use of positive pressure, forces steam or another medium through a seal 105 into a spindle 108. The spindle 108 is secured in place by a bearing mechanism 110. The steam continues into steam tubes 113 secured by an O-ring seal 115. The steam exits through a plurality of orifices 118. Preferably, two of the orifices 118 are angled at 90 degrees and two are angled at 20 degrees from the vertical. In an embodiment of the invention, the steam tube 113 is easily removable allowing for easy replacement. For example, the steam tube may be press-fitted to the remainder of the tube, or utilize other fastening mechanisms, such as tab and notch, etc. A plurality of fan blades 83 force excess steam into contact with the belt 11, thereby causing a cleaning action. A thermally insulating pocket 120 in the disc minimizes heat loss through tube walls.

Figure 6:
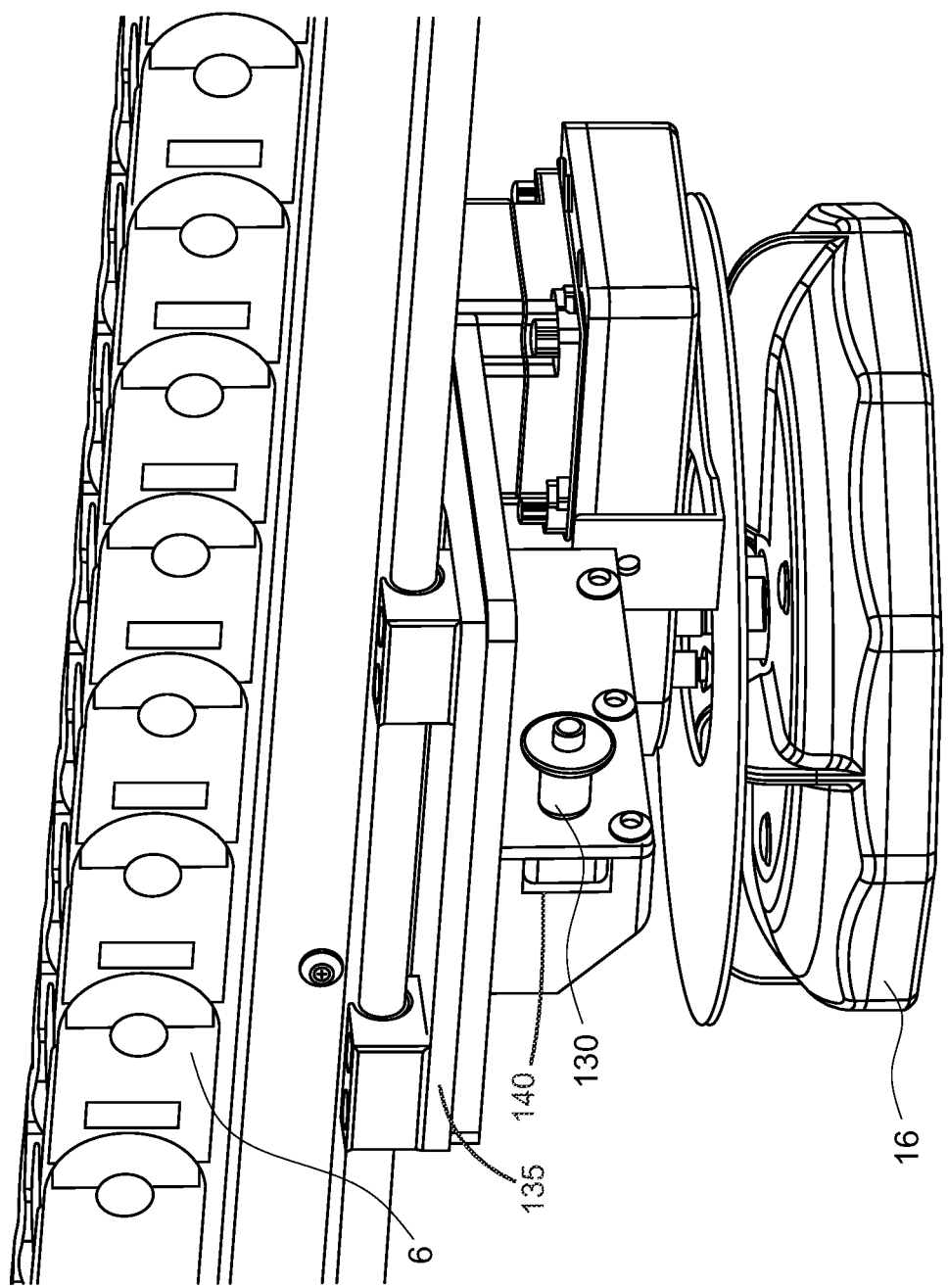
FIG. 6 shows an isometric side view of the modular cleaning head affixed by means of a clevis.
Figure 7:
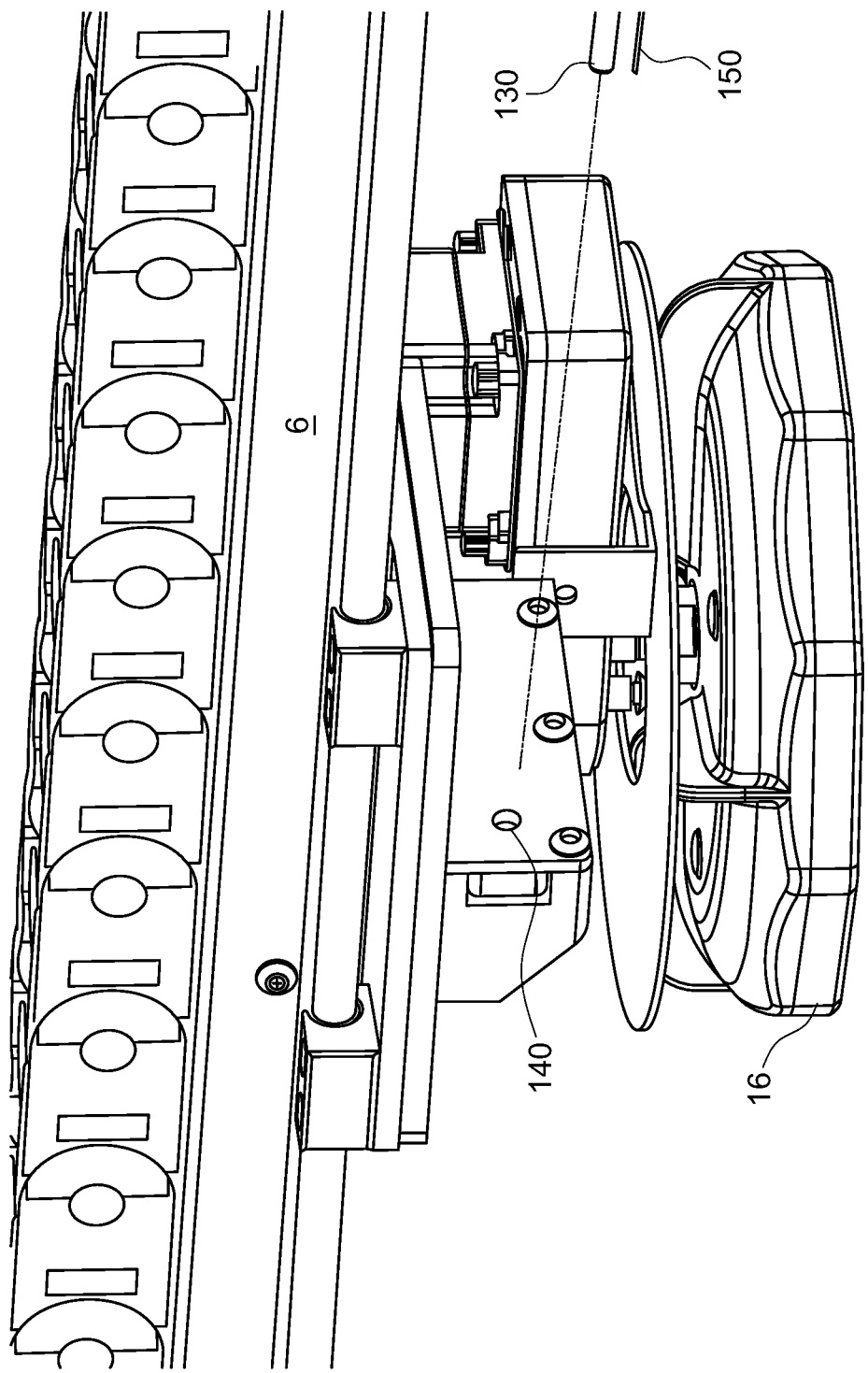
FIG. 7 shows an isometric side view of the modular cleaning head with the clevis removed.
Figure 8:
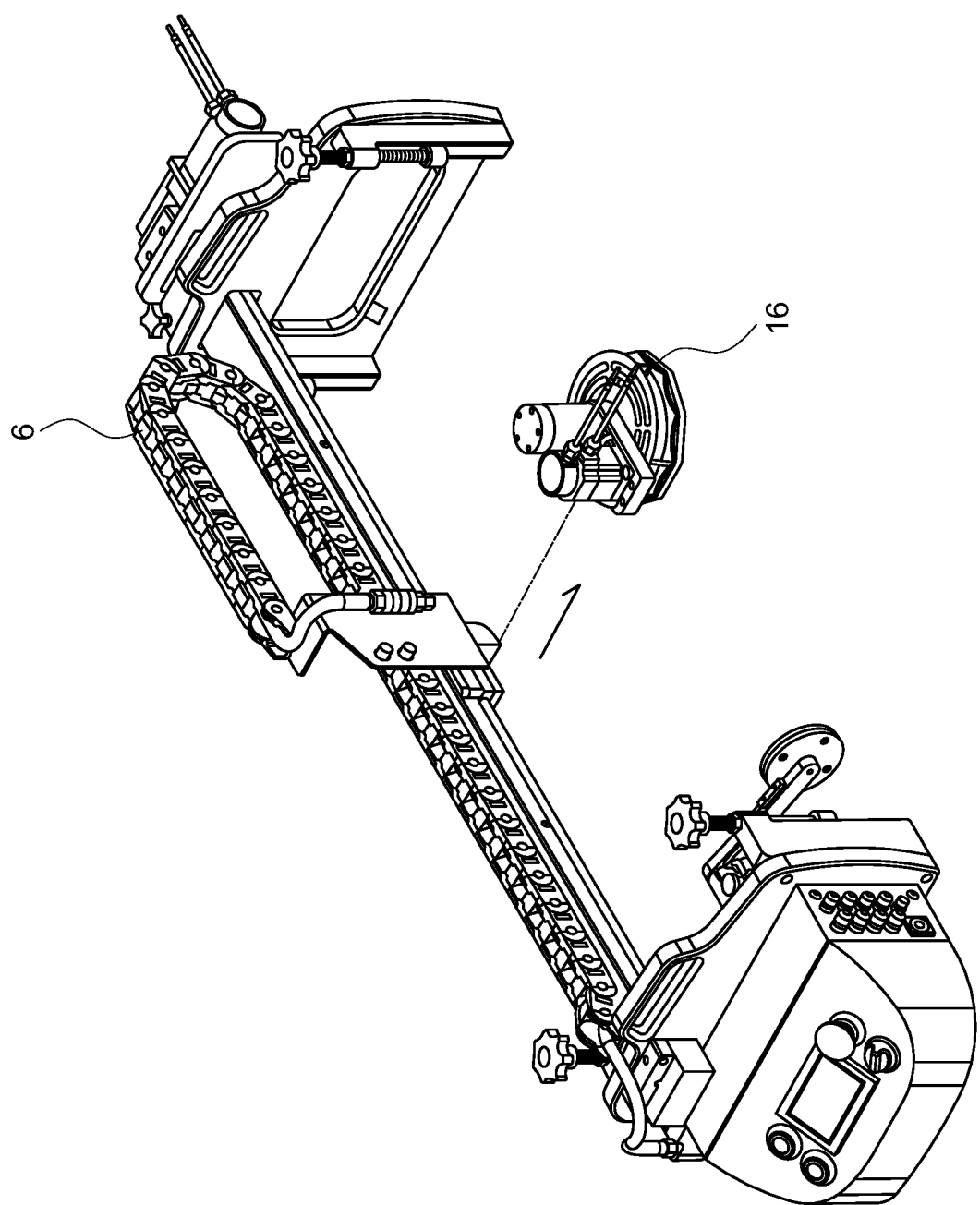
FIG. 8 shows an isometric top view of the modular head cleaning device with the modular head removed.

As shown in FIGS. 6, 7 and 8, the modular cleaning head 2 with the rotary cleaning head 16 is removable from the wire carriage 6 and affixed in place by the connecting bar 69 (FIG. 2) mated to a rectangular hole 140, fastened with a clevis pin 130 and tethered 150 to the carriage/dolly 135. The clevis pin 130 can be manually removed by an operator allowing for removal of rotary cleaning head 16.

Figure 9:
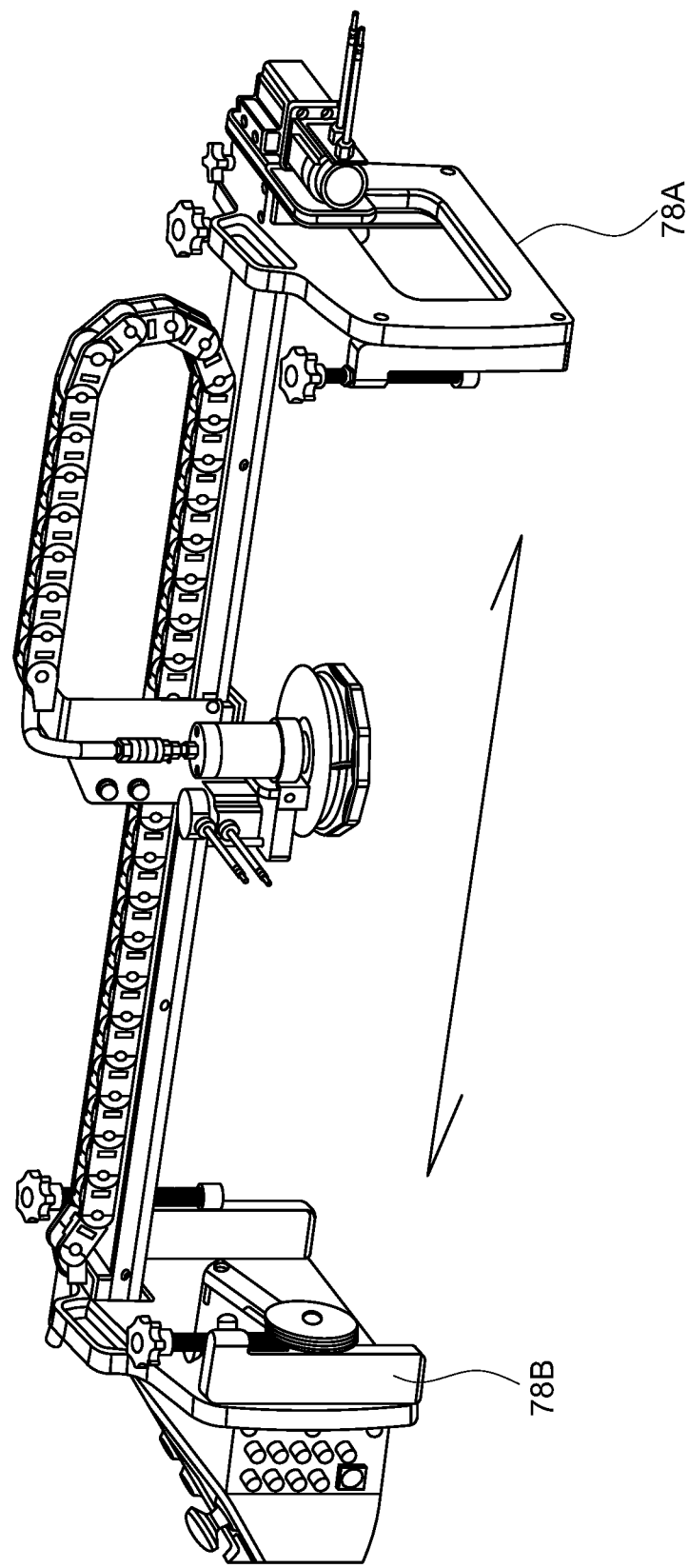
FIG. 9 shows a schematic view of modular head cleaning device showing the slide plates at maximum extension.
Figure 10:
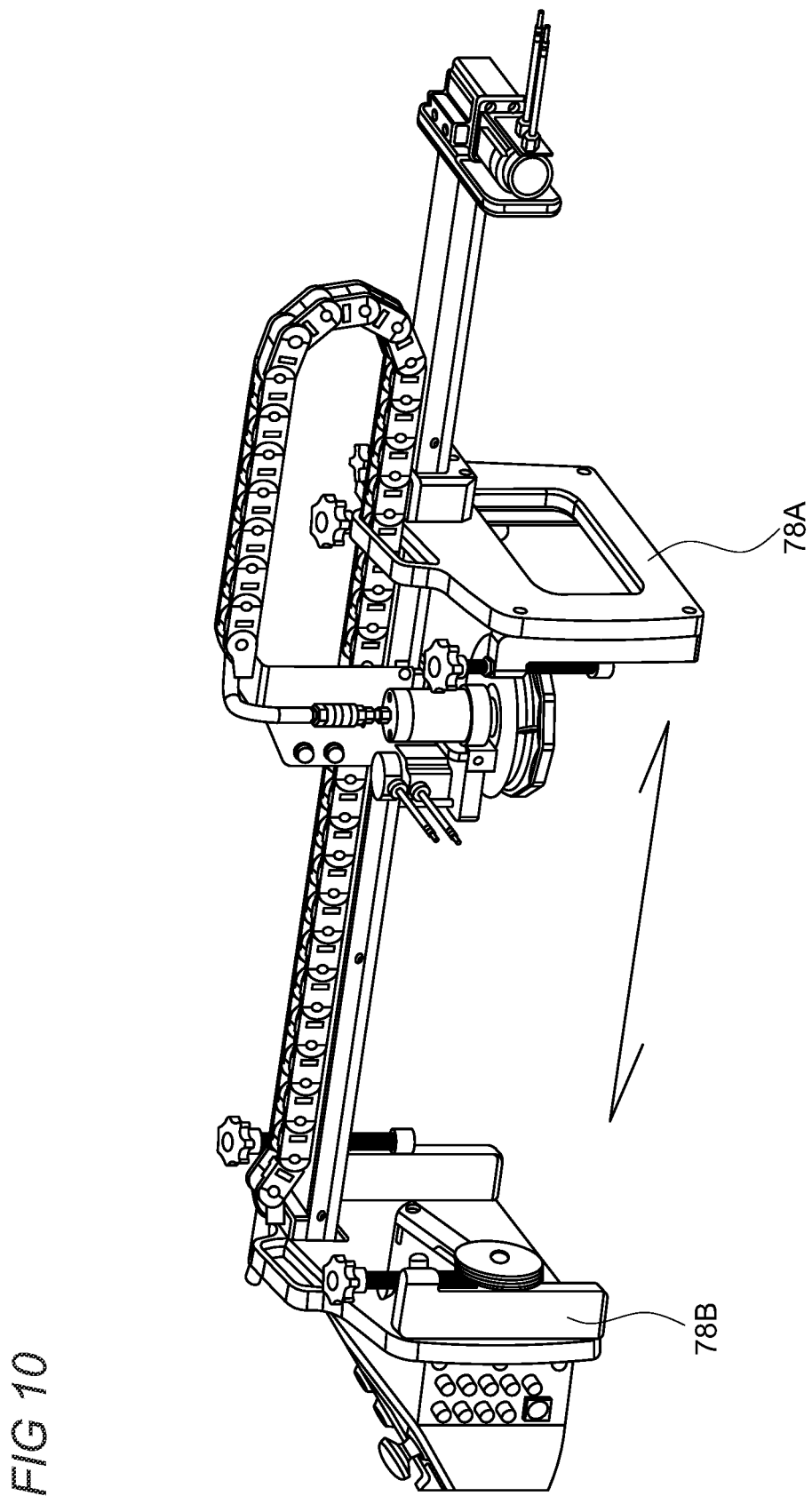
FIG. 10 shows a schematic view of modular head cleaning device showing the slide plates at an adjusted extension.

Detailed in FIGS. 9 and 10 are the slide plates 78a, b. In FIG. 9, slide plates 78(a,b) are shown at a maximum width for accommodating the belt 11. Slide plates can be adjusted to accommodate a narrower belt 11 as shown in FIG. 10.

FIGS. 11-13 show an embodiment of the invention using a fluid or vapor to clean the belt 11. The fluid or vapor under pressure is input to a fluid connection 155. The fluid or vapor then travels along a flexible hose 157 disposed along the wire carriage 6 to the rotary cleaning head 16. In an embodiment of the invention, steam under pressure is fed into the rotary cleaning head 16 by a spindle 108. The steam is then redirected at a hub 160 into the steam tubes 113 exiting at a plurality of nozzles 170. In an embodiment of the present invention, two first nozzles 115 are 90 degrees to the horizontal and two second 117 nozzles are 70 degrees to the horizontal.

There are sweeping bends in tubes through which the steam/fluid passes, which helps eliminate turbulence and improve velocity. The tubes may be comprised of steel, graphite, plastic, carbon, and any other polymer to effectuate the purposes herein. This delivers greater cleaning power and reduced moisture content to surfaces relative to at least some other designs. For example, the increased efficiency of steam or fluid delivery is due to the gradual sweeping curvature of the tube instead of an abrupt 90° angle that can reduce cleaning power. While metal is typically utilized due to its long-lasting properties, other products may also be used, such as plastic, since metal may conduct heat away from the steam.

While the invention has been described by reference to various specific embodiments, it should be understood that numerous changes may be made within the spirit and scope of the inventive concepts described. Accordingly, it is intended that the invention is not limited to the described embodiments but will have full scope defined by the language of the following claims.

What is claimed is:

1. A cleaning apparatus including a rotary cleaning head for cleaning surfaces, the cleaning apparatus comprising:
   the rotary cleaning head capable of performing a cleaning action on a surface, said rotary cleaning head comprising a rotating disc assembly;
   a mobile mount operational to move the rotary cleaning head into a first cleaning contact position with the surface;
   a connecting portion having a proximal end and a distal end wherein the proximal end includes a first coupling, said coupling capable of making a connection to and disconnecting from the mobile mount, and said distal end capable of making a connection and disconnecting from the rotary cleaning head and adapted for use with the rotary cleaning head; and a plurality of flanges proximally extending from the rotating disc assembly, wherein the flanges are capable of creating an airflow which performs said cleaning action.

2. The cleaning apparatus of claim 1, wherein the rotating disc assembly produces a thermally insulated pocket.

3. The cleaning apparatus of claim 1, further comprising a plurality of cogs for driving the rotary cleaning head.

4. The cleaning apparatus of claim 1, wherein the rotary cleaning head further comprises a removable spindle.

5. The cleaning apparatus of claim 1, further comprising:
a pump operably connected to the rotary cleaning head by a hose, said hose operable to cause a liquid or vapor under pressure to enter the rotary cleaning head;
wherein the rotary cleaning head directs the liquid or vapor under pressure to the upper belt to produce a cleaning action on the surface.

6. A system that utilizes a rotary cleaning head for cleaning an endless conveyor belt comprising:
the rotary cleaning head capable of performing a cleaning action on a first section of the endless conveyor belt, wherein the rotary cleaning head further comprises a removable spindle;
a mobile mount operational to move the rotary cleaning head into a first cleaning contact position with the endless conveyor belt;
a connecting portion having a proximal end and a distal end wherein the proximal end includes a first coupling, said coupling capable of making a connection to and disconnecting from the mobile mount, and said distal end capable of making a connection and disconnecting from the rotary cleaning head and adapted for use with the rotary cleaning head; and
a first reservoir capable of attaching to the system and configured to deliver a first medium to the endless conveyor.

7. The system of claim 6, wherein the rotary cleaning head further comprises a plurality of fan blades operable to increase a pressure in a steam.

8. The system of claim 6, wherein the rotating cleaning head further comprises a plurality of flanges proximally extending from the disc, wherein the flanges are capable of creating an airflow, and wherein said airflow performs said cleaning action.

9. The system of claim 6, wherein the rotating cleaning head produces a thermally insulated pocket.

10. The system of claim 6, further comprising a plurality of cogs for driving the rotary cleaning head.

11. The system of claim 6, further comprising:
a pump operably connected to the rotary cleaning head by a hose, said hose operable to cause a liquid or vapor under pressure to enter the rotary cleaning head,
wherein the rotary cleaning head directs the liquid or vapor under pressure to the upper belt to produce a cleaning action on said conveyor belt.

12. The system of claim 6, wherein the rotary cleaning head further comprises a plurality of fan blades operable to increase a pressure in a steam.

13. The apparatus of claim 6, wherein the rotary cleaning head further comprises a rotating disc assembly.

14. A method for cleaning an endless conveyor belt using a rotary cleaning head comprising:
attaching the rotary cleaning head capable of performing a cleaning action on a first section of the endless conveyor belt to a distal end of a connecting portion, said rotary cleaning head comprising a rotating disc assembly;
attaching the connecting portion to a first coupling of the mobile mount;
moving the rotary cleaning head into a first cleaning contact position with the endless conveyor belt by use of the mobile mount;
performing a cleaning action on a first section of the endless conveyor belt; and
directing, by a plurality of fan blades, pressurized steam into cleaning contact with the convey belt.

15. The method of claim 14, wherein the rotary cleaning head further comprises a removable spindle.

16. The method of claim 14, further comprising:
attaching a pump to the rotary cleaning head by a hose, said hose operable to cause a liquid or vapor under pressure to enter the rotary cleaning head;
directing the liquid or vapor under pressure to the upper belt to produce a cleaning action on said conveyor belt.

17. A modular cleaning head, comprising:
a rotary disc configured to clean surfaces while engaging in a rotational movement;
a deflector plate positioned above the rotary disc on a side opposite a surface that that rotary disc cleans; and
fan blades attached to the rotary disc, in which the fans are positioned above the rotary disc and are adjacent to a bottom surface of the deflector plate.

18. The modular cleaning head of claim 17, wherein the fan blades extend from a central region of the rotary disc to a radial end of the rotary disc.

19. The modular cleaning head of claim 18, wherein the fan blades are at least partially curved.

20. The modular cleaning head of claim 19, wherein, during rotational movement of the rotary disc, a laterally extending air shield is developed which prevents or reduces debris from engaging with the rotary cleaning head during cleaning operations.

21. The modular cleaning head of claim 17, wherein the rotary disc is polygonal-shaped.

22. The modular cleaning head of claim 21, wherein the rotary disc is decagon shaped.

23. The modular cleaning head of claim 17, further comprising a connecting bar that connects to an external structure.

24. The modular cleaning head of claim 23, wherein the connecting bar is substantially horizontal.

25. The modular cleaning head of claim 17, further comprising a motor that is part of the rotary cleaning head's frame.

26. The modular cleaning head of claim 25, wherein the motor imparts drive from a drive chain to an adjacently-positioned cog and pulley arrangement which translates the drive to the rotary disc.

* * * * *